US012763307B2

(12) United States Patent
Jones et al.

(10) Patent No.: US 12,763,307 B2

(45) Date of Patent: Oct. 13, 2026

(54) SAMPLE ANALYSIS

(71) Applicant: Micromass UK Limited, Wilmslow (GB)

(72) Inventors: Emrys Jones, Manchester (GB); Steven Derek Pringle, Darwen (GB); Michael Raymond Morris, Glossop (GB)

(73) Assignee: Micromass UK Limited, Wilmslow (GB)

( * ) Notice: Subject to any disclaimer, the term of this patent is extended or adjusted under 35 U.S.C. 154(b) by 483 days.

(21) Appl. No.: 18/260,285

(22) PCT Filed: Jan. 5, 2022

(86) PCT No.: PCT/GB2022/050002

§ 371 (c)(1),
(2) Date: Jul. 3, 2023

(87) PCT Pub. No.: WO2022/148593

PCT Pub. Date: Jul. 14, 2022

(65) Prior Publication Data

US 2024/0297032 A1 Sep. 5, 2024

(30) Foreign Application Priority Data

Jan. 5, 2021 (GB) ..................................... 2100096

(51) Int. Cl.
*H01J 49/16* (2006.01)
*H01J 49/00* (2006.01)
(Continued)

(52) U.S. Cl.
CPC ........ *H01J 49/167* (2013.01); *H01J 49/0031* (2013.01); *H01J 49/022* (2013.01);
(Continued)

(58) Field of Classification Search
CPC .... H01J 49/167; H01J 49/0031; H01J 49/022; H01J 49/0445; H01J 49/165; H01J 49/049
See application file for complete search history.

(56) References Cited

U.S. PATENT DOCUMENTS 7,364,913 B2 * 4/2008 Andrien, Jr. ........ H01J 49/0445 250/281
7,902,499 B2 * 3/2011 Hiraoka ................ H01J 49/161 250/281
(Continued)

FOREIGN PATENT DOCUMENTS

EP 2567395 A2 3/2013
WO 2005094389 A2 10/2005
(Continued)

OTHER PUBLICATIONS

Examination Report for United Kingdom Patent Application No. GB2200045.9, mailed Jul. 23, 2024.
(Continued)

*Primary Examiner* — Wyatt A Stoffa
(74) *Attorney, Agent, or Firm* — Goodwin Procter LLP

(57) ABSTRACT

A method of analysing a sample is disclosed in which a solvent emitting capillary is brought into contact with, or proximate to, a sample such that analyte from the sample is absorbed by solvent emitted from the capillary. A voltage is applied to the such that charged droplets of the solvent comprising the analyte from the sample are emitted from the capillary. The charged droplets are caused to be drawn into one or more sampling conduits connected to an atmospheric interface of an analytical instrument.

15 Claims, 8 Drawing Sheets

(51) Int. Cl.
*H01J 49/02* (2006.01)
*H01J 49/04* (2006.01)
(52) U.S. Cl.
CPC ........ *H01J 49/0445* (2013.01); *H01J 49/049* (2013.01); *H01J 49/165* (2013.01)

(56) References Cited

U.S. PATENT DOCUMENTS

| | | | | | |
|---|---|---|---|---|---|
| 11,195,709 | B2 * | 12/2021 | Jones | H01J 49/0445 | |
| 11,688,598 | B2 * | 6/2023 | Jones | H01J 49/16 | 250/288 |
| 12,125,693 | B2 * | 10/2024 | Cooks | H01J 49/145 | |
| 2002/0121598 | A1 * | 9/2002 | Park | H01J 49/107 | 250/288 |
| 2004/0227072 | A1 | 11/2004 | Park | | |
| 2007/0257190 | A1 * | 11/2007 | Li | H01J 49/165 | 250/281 |
| 2008/0315083 | A1 * | 12/2008 | Lubda | G01N 30/7266 | 422/69 |
| 2009/0294660 | A1 * | 12/2009 | Whitehouse | H01J 49/168 | 250/288 |
| 2010/0078550 | A1 * | 4/2010 | Wiseman | G01N 1/405 | 250/288 |
| 2011/0049352 | A1 * | 3/2011 | Ding | H01J 49/0463 | 250/288 |
| 2011/0220784 | A1 * | 9/2011 | Roach | H01J 49/165 | 250/288 |
| 2012/0149009 | A1 * | 6/2012 | Levis | H01J 49/145 | 435/5 |
| 2014/0291544 | A1 * | 10/2014 | Hardman | H01J 49/107 | 250/423 R |
| 2016/0126080 | A1 * | 5/2016 | Kertesz | H01J 49/04 | 250/288 |
| 2016/0203968 | A1 | 7/2016 | Otsuka et al. | | |
| 2016/0341712 | A1 * | 11/2016 | Agar | G01N 33/4833 | |
| 2017/0294296 | A1 | 10/2017 | Trivett et al. | | |
| 2019/0295833 | A1 * | 9/2019 | Hart | H01J 49/10 | |
| 2026/0121008 | A1 * | 4/2026 | Reiss | H01J 49/0495 | |

FOREIGN PATENT DOCUMENTS

| | | | | |
|---|---|---|---|---|
| WO | 2009070555 | A1 | 6/2009 | |
| WO | 2011140492 | A2 | 11/2011 | |
| WO | 2018189534 | A1 | 10/2018 | |
| WO | WO-2018189533 | A1 * | 10/2018 | H01J 49/0463 |

OTHER PUBLICATIONS

International Search Report and Written Opinion for International Patent Application No. PCT/GB2022/050002, mailed May 6, 2022.
Combined Search and Examination Report for United Kingdom Patent Application No. GB2200045.9, mailed Jun. 24, 2022.
Wiley, J.S., et al., "Handheld Low-Temperature Plasma Probe for Portable "Point-and-Shoot" Ambient Ionization Mass Spectrometry", Analytical Chemistry, 85(14):6545-6552, Jul. 16, 2013.
Yamada, Y., et al., "Development of Remote Sampling ESI Mass Spectrometry for the Rapid and Automatic Analysis of Multiple Samples", Mass Spectrometry, 5(2): S0068, (2016).

* cited by examiner

Single extraction and sampling on Xevo-G2XS
2m of tubing from sampling to inlet

SAMPLE ANALYSIS

CROSS-REFERENCE TO RELATED APPLICATIONS

This application is a U.S. national phase filing claiming the benefit of and priority to International Patent Application No. PCT/GB2022/05002, filed Jan. 5, 2022, which claims priority from and the benefit of United Kingdom patent application 2100096.3 filed Jan. 5, 2021, the entire contents of these applications are incorporated herein by reference.

FIELD OF THE INVENTION

The present invention relates generally to analysing a sample, and in particular to methods of analysing a sample by mass and/or ion mobility spectrometry.

BACKGROUND

Various ambient ionisation techniques have been developed for use in mass and/or ion mobility spectrometry wherein analyte material is generated, and in some cases ionised, outside of the instrument under ambient (atmospheric) conditions and typically without any significant sample preparation or separation. For instance, analyte material may be desorbed or ablated directly from the surface of a sample with the resulting analyte material liberated from the surface then being collected ('sampled') and passed towards an inlet of a mass or ion mobility spectrometer for analysis. The liberated analyte material may already contain ions that can be analysed or the analyte material may be subject to a further step of ionisation or secondary ionisation as it is passed to the analysis instrument.

Ambient ionisation techniques can provide very rich data sets. Furthermore, in terms of imaging or surface sampling methods, ambient ionisation may have various advantages compared to traditional techniques such as matrix-assisted laser desorption ionisation ('MALDI') wherein the sample preparation steps may take a significant amount of time rendering them unsuitable for some applications.

However, there are currently some barriers to greater acceptance and uptake of such techniques.

SUMMARY

According to a first aspect, there is provided a method of analysing a sample, the method comprising:

- providing a capillary having an outlet at a first end;
- supplying a flow of solvent to the capillary such that solvent is emitted from the outlet of the capillary;
- bringing the sample and the first end of the capillary into contact with, or proximate to, each other such that analyte from the sample is absorbed by solvent emitted from the outlet of the capillary;
- applying a voltage to the solvent such that charged droplets of the solvent comprising the analyte from the sample are emitted from the first end of the capillary; and
- causing the charged droplets to be drawn into one or more sampling conduits connected to an atmospheric interface of an analytical instrument.

Embodiments are directed to an ambient ionisation technique in which a flow of solvent is supplied to one end of a solvent capillary such that solvent passes along the central bore of capillary and is emitted and the other, solvent emitting end (tip) of the capillary. The tip is brought proximate to, or into contact with, a sample to be analysed, such that analyte material from the sample collects around the tip of the capillary. The tip and sample may subsequently be separated, and a voltage applied such that the collected analyte material is emitted from the capillary tip in charged solvent droplets, which are subsequently sampled. The emitted solvent may subsequently evaporate, such that analyte ions are released, and the analyte ions may be analysed, for example by mass spectrometry and/or ion mobility spectrometry.

As will be discussed in more detail below, the inventors have found that embodiments of the present invention can provide a method of analysing a sample that is particularly convenient and simple, e.g. as compared to existing ambient ionisation techniques. For example, the present invention can allow direct sampling of both surfaces and liquids using a single apparatus configured in the same manner. Furthermore, the present invention can provide a handheld analysis device which can be freely brought into contact with a sample remote from an analytical instrument, e.g. in order to provide a 'point-and-click' type analysis. Furthermore, the relatively small contact area and e.g. continuous supply of solvent that can be supplied by the capillary can allow repeat analyses to be performed on conveniently short timescales, with little or no signal carry over between consecutive analyses.

The capillary may be housed by a housing. The housing may form a handle. The method may comprise a user holding the handle. For example, the sample and the first end of the capillary may be brought into contact with, or proximate to, each other by a user holding the handle.

The capillary may comprise a bore that runs centrally along a longitudinal axis of the capillary and forms the outlet at the first end of the capillary. The flow of solvent may be supplied to the capillary such that the solvent passes through the bore of the capillary and is then emitted from the outlet of the capillary.

The axial bore may run centrally along the entire axial length of the capillary. The flow of solvent may flow through the central axial bore along the central axis of the capillary, and then be emitted from the outlet. Correspondingly, the outlet of the capillary may be positioned centrally on the axis of the capillary, such that solvent is emitted on the central axis of the capillary. In other words, the bore may be non-annular.

The flow of solvent may be supplied to an axial end of the capillary opposite to the outlet.

Supplying the flow of solvent may comprise providing a solvent supply line connected to the capillary (e.g. at the axial end of the capillary opposite to the outlet), and supplying the solvent via the solvent supply line.

The solvent supply line may be flexible.

The solvent supply line may be connected to the capillary at one end, and to a supply of solvent at the other end. Supplying the flow of solvent may comprise causing solvent from the solvent supply to pass through the solvent supply line to the capillary, for example by applying a suitable pressure difference, e.g. using a pump.

Bringing the sample and first end of the capillary into contact with, or proximate to, each other may comprise moving the sample and/or moving the first end of the capillary so that the sample and first end of the capillary touch each other or are sufficiently close to each other to cause analyte from the sample to be absorbed by solvent emitted from the outlet of the capillary.

Analyte from the sample being absorbed by the solvent may include the analyte being dissolved by the solvent.

The method may comprise, after bringing the sample and first end of the capillary into contact with, or proximate to, each other, then separating the first end of the capillary and the sample.

Applying a voltage to the solvent may comprise applying the voltage after separating the first end of the capillary and the sample.

The voltage may not be applied while the sample and first end of the capillary are in contact with, or proximate to, each other.

The method may comprise deactivating the voltage, then bringing the sample and the first end of the capillary into contact with, or proximate to, each other, then separating the sample and the first end of the capillary, and then reactivating the voltage.

Alternatively, the voltage may be applied while the sample and first end of the capillary are in contact with, or proximate to, each other. For example, the voltage may be applied continuously, e.g. before, during and after the sample and first end of the capillary are in contact with, or proximate to, each other.

The voltage may be applied while the charged droplets are being drawn into one or more sampling conduits.

Applying a voltage to the solvent may comprise providing an electrode in direct contact with the solvent, and applying the voltage to the electrode. Where the capillary is electrically conductive, applying a voltage to the solvent may comprise applying the voltage to the capillary.

The voltage may be supplied to the electrode or capillary via a conductor that is electrically connected to the electrode or capillary at one end, and to a voltage supply at the other end.

The conductor may be an electrical wire, that may be flexible.

The charged droplets may be emitted from the first end of the capillary as a spray, and a nebulising gas may be not used to form the spray.

The charged droplets of the solvent comprising the analyte from the sample may be emitted from the first end of the capillary and then drawn into the one or more sampling conduits without impacting the sample.

The one or more sampling conduits may transport charged droplets drawn into one or more sampling conduits towards the atmospheric interface of the analytical instrument.

The one or more sampling conduits may be one or more sampling tubes.

The one or more sampling conduits may be inert.

The one or more sampling conduits may be flexible.

The one or more sampling conduits may each have a length of at least 1 m, at least 2 m, at least 3 m, or at least 4 m.

The solvent supply line and/or conductor and/or one or more sampling conduits may be configured such that the first end of the capillary (and the housing) can be freely manipulated in three dimensions (by the handle).

The first end of the capillary may be arranged at (and extend from) a distal end of the housing. The solvent supply line and/or the conductor and/or the one or more sampling conduits may extend from the housing from a proximal end of the housing. The solvent supply line and/or the conductor and/or the one or more sampling conduits may be mechanically linked to form a single (flexible) assembly.

The one or more sampling conduits may comprise one or more inlets.

Causing the charged droplets to be drawn into the one or more sampling conduits may comprise moving the first end of the capillary and/or moving the one or more inlets such that the charged droplets emitted from the first end of the capillary are drawn into the one or more sampling conduits through the one or more inlets.

The one or more inlets may directly receive droplets emitted from the first end of the capillary without the droplets impacting the sample. That is, the one or more inlets may be positioned (immediately) downstream of the first end of the capillary.

The first end of the capillary and/or the one or more inlets may be moveable (with respect to the housing) between a first position in which the first end of the capillary and the one or more inlets are positioned away from each other, and a second position in which the one or more inlets are positioned (proximate to and) downstream of the first end of the capillary (and the first end of the capillary is positioned upstream of the one or more inlets).

The capillary and/or the one or more sampling conduits may be (fixedly) connected to a moveable member that is moveably connected to the housing such that the first end of the capillary and/or the one or more inlets can move between the first and second positions.

The method may comprise bringing the sample and the first end of the capillary into contact with, or proximate to, each other while the first end of the capillary and/or the one or more inlets are positioned in the first position; and causing the charged droplets to be drawn into the one or more sampling conduits may comprise moving the first end of the capillary and/or the one or more inlets into the second position.

In the first position, the one or more inlets may be positioned away from the first end of the capillary such that the first end of the capillary can be freely brought into contact with the sample without interference by the one or more inlets. In the second position, the one or more inlets may directly receive droplets emitted from the first end of the capillary without the droplets impacting the sample.

The capillary may be connected to the housing and/or the moveable member such that the first end of the capillary can move relative to (the housing and) the one or more inlets between the first position and the second position. In this case, the one or more sampling conduits may be (fixedly) connected to the housing such that the one or more inlets are fixed in position with respect to the housing.

The one or more inlets may be arranged within the housing. In the first position, the first end of the capillary may extend out of the housing. In the second position, the first end of the capillary may be arranged within the housing.

The capillary and/or moveable member may be slidably connected to the housing such that the first end of the capillary can move between the first and second positions by sliding the capillary and/or moveable member. Moving the first end of the capillary and/or the one or more inlets into the second position may comprise sliding (retracting) the capillary into the second position.

The one or more sampling conduits may be connected to the housing and/or the moveable member such that the one or more inlets can move relative to (the housing and) the first end of the capillary between the first position and the second position. In this case, the capillary may be (fixedly) connected to the housing such that the first end of the capillary is fixed in position with respect to the housing.

The moveable member may be a rotatable member. The one or more inlets may be connected to a rotatable member that is rotatably connected to the housing such that the one or more inlets can move relative to the first end of the capillary between the first and second positions by rotating the rotatable member. Moving the first end of the capillary and/or the one or more inlets into the second position may comprise rotating the rotatable member into the second position.

The rotatable member may form a cover for the first end of the capillary when it is in the second position.

The first end of the capillary may be exposed in the first position and covered by the rotatable member in the second position.

The voltage may be not applied in the first position, and applied in the second position.

The method may comprise causing evaporation of the charged droplets such that analyte ions are released, and the analytical instrument may analyse the analyte ions.

Causing evaporation of the charged droplets may comprise heating the charged droplets.

Heating the charged droplets may comprise heating the one or more sampling conduits and/or heating a component of the analytical instrument, for example a component of the atmospheric interface. For example, droplets may be heated by being passed through a heated capillary in the atmospheric interface.

The method may comprise using the analysis of the analyte ions to classify the sample. The classification of the sample may be performed substantially in real time.

The analytical instrument may be a mass spectrometer and/or an ion mobility spectrometer.

The analytical instrument analysing the analyte ions may comprise the analytical instrument obtaining mass to charge ratio and/or ion mobility data for the analyte ions.

Classifying the sample may comprise comparing the mass to charge ratio and/or ion mobility data for the analyte ions to a library of mass to charge ratio and/or ion mobility data, and determining the identity of the sample using the comparison.

According to a second aspect, there is provided an apparatus for analysing a sample, the apparatus comprising:

- a capillary comprising a bore that runs centrally along a longitudinal axis of the capillary and forms an outlet at a first end of the capillary;
- a solvent supply line configured to supply a flow of solvent to the capillary such that solvent passes through the bore of the capillary and is emitted from the outlet of the capillary;
- a conductor configured to apply a voltage to solvent supplied to the capillary by the solvent supply line such that charged droplets of the solvent are emitted from the first end of the capillary; and
- one or more sampling conduits connectable to an atmospheric interface of an analytical instrument, wherein the one or more sampling conduits comprise one or more inlets, wherein the one or more inlets are moveable relative to the first end of the capillary and/or the first end of the capillary is moveable relative to the one or more inlets, and wherein the one or more inlets are configured to receive charged droplets emitted from the first end of the capillary when positioned downstream of the first end of the capillary.

The apparatus may further comprise a housing for the capillary. The housing may form a handle. The apparatus may be handheld.

The apparatus may be configured such that, when the first end of the capillary and a sample are brought into contact with, or proximate to, each other, analyte from the sample is absorbed by solvent emitted from the outlet of the capillary, and when the first end of the capillary and the sample are subsequently separated, and a voltage is applied to the solvent by the conductor, charged droplets of the solvent comprising the analyte from the sample are emitted from the first end of the capillary. The charged droplets of the solvent comprising the analyte from the sample may be received by the one or more inlets when the one or more inlets are positioned downstream of the first end of the capillary.

The axial bore may run centrally along the entire axial length of the capillary. The solvent supply line may supply a flow of solvent such that the flow of solvent flows through the central axial bore along the central axis of the capillary, and is then emitted from the outlet. Correspondingly, the outlet of the capillary may be positioned centrally on the axis of the capillary, such that solvent is emitted on the central axis of the capillary.

The solvent supply line may be connected to (and supply the flow of solvent to) an axial end of the capillary opposite to the outlet.

The solvent supply line may be flexible.

The solvent supply line may be connected to the capillary at one end, and to a supply of solvent at the other end. The apparatus may comprise a device configured to cause solvent from the solvent supply to pass through the solvent supply line to the capillary, e.g. a pump. The device may be controllable to either cause solvent to be supplied to the capillary via the solvent supply line or to cause solvent to not be supplied to the capillary.

The solvent may be configured to dissolve analyte from a sample.

The apparatus may be freely manipulatable in three dimensions, for example, by the handle. For example, the apparatus may be moved (by the handle) so that the first end of the capillary touches a sample or is sufficiently close to a sample such that analyte from the sample is absorbed by solvent emitted from the outlet of the capillary. The apparatus may be subsequently moved (by the handle) so that the first end of the capillary moves away from the sample.

The apparatus may comprise a voltage supply configured to supply a voltage to the conductor. The voltage supply may be controllable to either supply a voltage or not supply a voltage.

The conductor may be an electrical wire, that may be flexible.

The apparatus may comprise an electrode in direct contact with the solvent. The conductor may be electrically connected at one end to a voltage supply, and to the electrode at the other end.

Where the capillary is electrically conductive, the conductor may be electrically connected at one end to a voltage supply, and to the capillary at the other end.

The apparatus may be configured such that the charged droplets are emitted from the first end of the capillary as a spray by providing the solvent to the capillary and without the use of a nebulising gas.

The apparatus may be configured such that charged droplets emitted from the first end of the capillary can be directly received by the one or more inlets directly (without impacting a sample) when the one or more inlets are positioned downstream of the first end of the capillary.

The apparatus may comprise the analytical instrument that comprises the atmospheric interface. The one or more sampling conduits may be connected to the atmospheric interface of the analytical instrument.

The one or more sampling conduits may be configured to transport charged droplets received by the one or more inlets towards the atmospheric interface of the analytical instrument.

The one or more sampling conduits may be one or more sampling tubes.

The one or more sampling conduits may be inert.

The one or more sampling conduits may be flexible.

The one or more sampling conduits may each have a length of at least 1 m, at least 2 m, at least 3 m, or at least 4 m.

The solvent supply line and/or conductor and/or one or more sampling conduits may be configured such that the first end of the capillary (and the housing) can be freely manipulated in three dimensions (by the handle).

The first end of the capillary may be arranged at (and extend from) a distal end of the housing. The solvent supply line and/or the conductor and/or the one or more sampling conduits may extend from the housing from a proximal end of the housing. The solvent supply line and/or the conductor and/or the one or more sampling conduits may be mechanically linked to form a single (flexible) assembly.

The first end of the capillary and/or the one or more inlets may be moveable (with respect to the housing) between a first position in which the first end of the capillary and the one or more inlets are positioned away from each other, and a second position in which the one or more inlets are positioned (proximate to and) downstream of the first end of the capillary (and the first end of the capillary is positioned upstream of the one or more inlets).

The capillary and/or the one or more sampling conduits may be (fixedly) connected to a moveable member that is moveably connected to the housing such that the first end of the capillary and/or the one or more inlets can move between the first and second positions.

In the first position, the one or more inlets may be positioned away from the first end of the capillary such that the first end of the capillary can be freely brought into contact with a sample without interference by the one or more inlets. In the second position, the one or more inlets may directly receive droplets emitted from the first end of the capillary without the droplets impacting a sample.

The capillary may be connected to the housing and/or the moveable member such that the first end of the capillary can move relative to (the housing and) the one or more inlets between the first position and the second position. In this case, the one or more sampling conduits may be (fixedly) connected to the housing such that the one or more inlets are fixed in position with respect to the housing.

The one or more inlets may be arranged within the housing. In the first position, the first end of the capillary may extend out of the housing. In the second position, the first end of the capillary may be arranged within the housing.

The capillary and/or moveable member may be slidably connected to the housing such that the first end of the capillary can move between the first and second positions by sliding the capillary and/or moveable member.

The one or more sampling conduits may be connected to the housing and/or the moveable member such that the one or more inlets can move relative to (the housing and) the first end of the capillary between the first position and the second position. In this case, the capillary may be (fixedly) connected to the housing such that the first end of the capillary is fixed in position with respect to the housing.

The moveable member may be a rotatable member. The apparatus may comprise a rotatable member rotatably connected to the housing. The one or more inlets may be connected to the rotatable member such that the one or more inlets move relative to the first end of the capillary between the first and second positions when the rotatable member is rotated.

The rotatable member may form a cover for the first end of the capillary when in the second position.

The first end of the capillary may be exposed in the first position and covered by the rotatable member in the second position.

The conductor and/or voltage supply and/or moveable member may be configured such that the voltage is not applied in the first position, and is applied in the second position.

The apparatus may further comprise a heater configured to heat charged droplets received by the one or more inlets.

The heater may heat the one or more sampling conduits and/or a component of the analytical instrument, for example a component of the atmospheric interface. For example, the heater may heat a capillary in the atmospheric interface that the droplets pass through.

The apparatus may be configured such that charged droplets received by the one or more inlets evaporate such that analyte ions are released. The apparatus may further comprise the analytical instrument. The one or more sampling conduits may be connected to the atmospheric interface of the analytical instrument. The analytical instrument may be configured to analyse the released analyte ions.

The apparatus may comprise a processor configured to use an analysis of analyte ions from a sample by the analytical instrument to classify the sample. The processor may be configured to perform the classification substantially in real time.

The analytical instrument may be a mass spectrometer and/or ion mobility spectrometer.

The analytical instrument may obtain mass to charge ratio and/or ion mobility data for analyte ions.

The processor may be configured to classify a sample by comparing mass to charge ratio and/or ion mobility data obtained for analyte ions from the sample to a library of mass to charge ratio and/or ion mobility data, and determining the identity of the sample using the comparison.

BRIEF DESCRIPTION OF THE DRAWINGS

Various embodiments will now be described, by way of example only, and with reference to the accompanying drawings in which.

DETAILED DESCRIPTION

Figure 1:
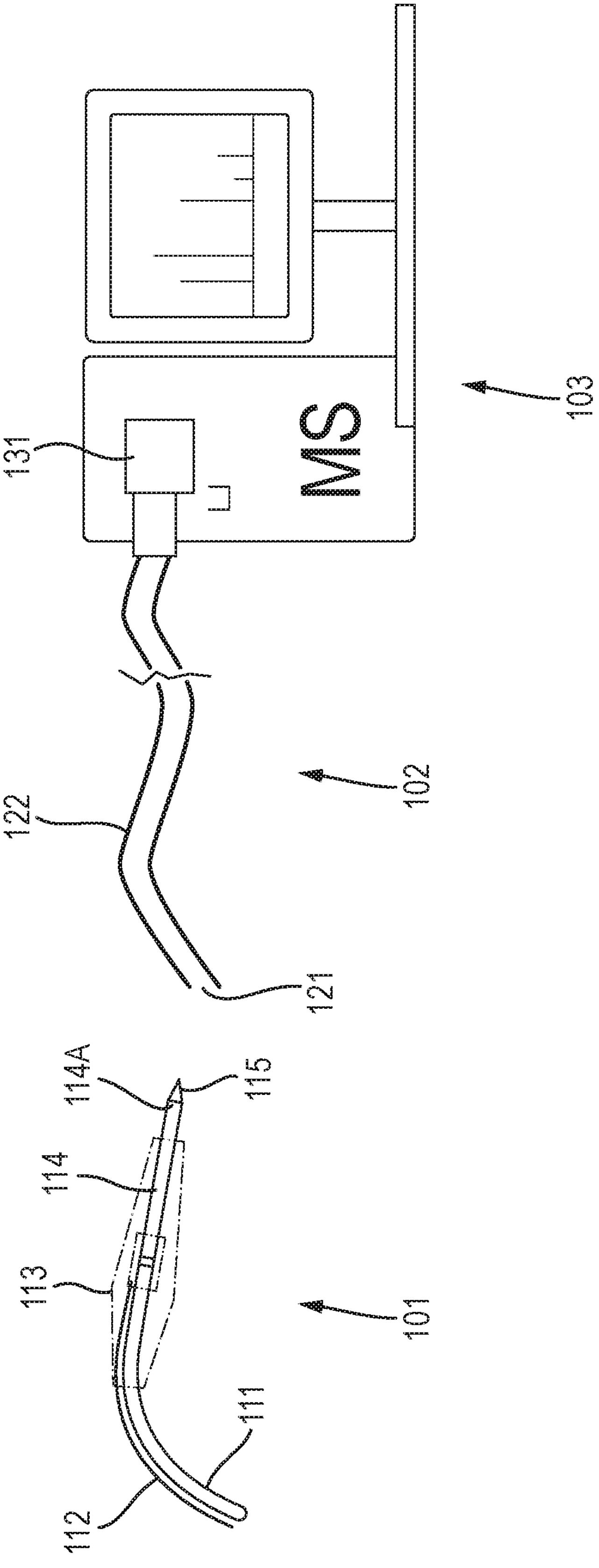
FIG. 1 shows a sample analysis apparatus in accordance with an embodiment.

FIG. 1 shows a sample analysis apparatus in accordance with an embodiment of the present invention. As shown in FIG. 1, the apparatus includes a solvent emitting device 101, a sampling assembly 102, and an analytical instrument 103.

The solvent emitting device 101 includes a capillary 114, to which a flow of solvent can be supplied. The solvent capillary 114 may be generally tubular, with solvent being supplied at one axial (solvent-receiving) (inlet) end, passing axially along a central bore, and being emitted at the opposite axial end, that is at an outlet or solvent-emitting tip 114A. The outlet (solvent-emitting tip) 114A of the capillary 114 may be tapered.

The solvent capillary 114 may be formed from any suitable material, such as fused silica and/or a metal, such as stainless steel, and/or a plastic, such as PEEK. In embodiments, the capillary 114 comprises fused silica with a plastic, e.g. PEEK, outer sheath. For example, the capillary 114 may be formed from PEEKsil™ tubing. The inventors have found PEEKsil™ tubing to be particularly robust.

The inner diameter of the capillary 114 may be between about 25 to 300 μm. The outer diameter of the capillary 114 may be between about 0.5 and 2 mm.

A flow of liquid solvent may be provided to the inlet of the capillary 114 by solvent supply tubing 111. The solvent supply tubing 111 may be formed, for example, from PEEKsil™ tubing. The solvent flow rate may be, for example, between about 5 and 15 μL/min, such as 7 μL/min or 10 μL/min.

The flow of solvent may be user controllable. For example, the apparatus may include means for activating and deactivating the flow of solvent (now shown). The flow of solvent may therefore be stopped or reduced, e.g. during periods of inactivity, and initiated when required.

The solvent may comprise any solvent suitable for absorbing analyte from a sample. For example, the solvent may comprise an organic solvent such as acetonitrile. As another example, the solvent may comprise methanol. Other suitable solvents may include dichloromethane (optionally mixed with methanol), dichloroethane, tetrahydrofuran, ethanol, propanol, nitromethane, toluene (optionally mixed with methanol or acetonitrile), or water. The solvent may further comprise an acid such as formic or acetic acid. The solvent may further comprise one or more additives. In embodiments, the solvent comprises a liquid with an organic component, such as methanol water. For example, the solvent may include 98% methanol and 2% water.

A voltage may be applied to the device 101 in order to charge the solvent. For example, a voltage between about 0 and 5 kV may be applied to the capillary 114 or solvent in order to charge the solvent. In embodiments, voltages between about 3.5 and 5 kV may be applied to the capillary 114 or solvent. As shown in FIG. 1, a voltage for charging the solvent may be supplied via an electrical cable 112. The operating resistance may be about 10 MO.

The application of a voltage may be user controllable. For example, the apparatus may include means for activating and deactivating the voltage (not shown). The voltage may therefore be not applied or reduced, e.g. during periods of inactivity, and initiated when required.

As shown in FIG. 1, when a suitable voltage and flow of solvent are used, a spray of charged solvent droplets (electrospray) 115 may be formed at the solvent-emitting outlet or tip 114A of the solvent capillary 114.

The capillary 114 may be housed in a housing 113. The solvent capillary 114 and housing 113 may be arranged coaxially. The solvent emitting device 101 may be a handheld device. The housing 113 may accordingly form a handle to allow a user to manipulate the device 101 by hand, e.g. freely in three dimensions. The housing 113 may be formed of a suitable e.g. insulating material, such as a plastic.

The solvent supply tubing 111 and/or electrical cable 112 may be configured to allow the device 101 to be freely manipulated by a user in three dimensions. For example, the solvent supply tubing 111 and/or electrical cable 112 may be suitably flexible. The solvent emitting device 101 may thus be freely brought into contact with a sample that is desired to be analysed, e.g. in order to provide a 'point-and-click' type analysis.

Furthermore, the solvent supply tubing 111 and electrical cable 112 may extend from the housing 113 from substantially the same location. For example, the solvent supply tubing 111 and electrical cable 112 may extend from an axial end of the housing 113 that is opposite to the outlet or solvent-emitting tip 114A.

Moreover, the solvent supply tubing 111 and electrical cable 112 may be mechanically linked to form a single flexible assembly. This can prevent tubing and cabling interfering with the sampling process, and thus increase user friendliness.

The solvent emitting device 101 may be configured such that when the solvent-emitting outlet or tip 114A of the solvent capillary 114 and a solid or liquid sample are brought into contact with (or sufficiently close to) each other (while a flow of solvent is being supplied to the capillary 114), liquid surrounding the solvent-emitting outlet or tip 114A becomes enriched with analyte molecules from the sample. When the solvent-emitting outlet or tip 114A and the sample are subsequently separated (and a voltage is supplied to the device 101), a spray of charged solvent droplets (electrospray) 115 may be formed at the solvent-emitting outlet or tip 114A of the solvent capillary 114, with droplets of the spray comprising (e.g. ionised) analyte from the sample.

To facilitate this, no nebulising gas may be supplied to the device 101, as the use of a nebulising gas may interfere with this analyte collection process. Moreover, the inventors have found that not using a nebulising gas can allow both solids and liquids to be sampled using the same apparatus configuration. Furthermore, not using a nebulising gas can simplify the device, and provide for more user friendly operation, e.g. as compared to using a nebulising gas to assist the formation of a spray of droplets.

Furthermore, the solvent-emitting outlet or tip 114A of the solvent capillary 114 may extend beyond the distal end of the housing 113, such that the housing 113 does not interfere with the analyte collection process. For example, the solvent capillary 114 may project beyond the distal end of the housing by a distance of at least 2 mm, 5 mm, or 10 mm. The solvent-emitting outlet or tip 114A of the solvent capillary 114 may thus provide a relatively small sample contact area.

The inventors have found that by providing a relatively small contact area at the tip 114A of the solvent emitting capillary 114, the amount of analyte material collected during contact with a sample can be relatively limited. This, together with the provision of a (e.g. continuous) flow of solvent, then means that following contact with the sample, substantially all, or most, of the collected analyte material can be emitted from the device 101 in a spray of charged droplets on a timescale of seconds, e.g. less than 1 s, 2 s, 3 s or 5 s. This means that a subsequent analysis can be performed using the device 101 within a few seconds of the previous analysis, with little or no signal carry over. A particularly convenient 'point-and-click' type analysis can thus be provided.

The time taken for substantially all or most collected analyte material to be emitted from the device 101 may depend, for example, on the nature of the sample, and the nature of and flow rate of the solvent. In embodiments, the solvent composition and/or flow rate may therefore be adjustable by a user.

The probe device 101 may thus be used for both the extraction of molecules from the sample (solid surface or liquid), and the generation of an electrospray of sample containing droplets.

The sampling assembly 102 may include one or more sampling tubes 122 that each include an inlet 121 at one end and an outlet at the other end that is connectable to an atmospheric pressure inlet 131 of the analytical instrument 103.

When the sampling tubing 122 is connected to the atmospheric pressure inlet 131 of the analytical instrument 103 and a spray of charged droplets 115 emitted by the solvent emitting device 101 is directed towards an inlet 121 of the tubing 122, the droplets may be drawn into the inlet 121 and along the tubing 122, towards the atmospheric pressure interface 131 of the analytical instrument 103, e.g. due to gas flow caused by a vacuum of the analytical instrument 103. At least some of the solvent may evaporate as it passes through the tubing 122, such that analyte ions are released.

The tubing 122 may comprise one or more flexible regions, e.g. to accommodate movement of the inlet 121 relative to the analytical instrument 103.

The one or more flexible regions may be provided at any position along the tubing 122. Alternatively (substantially) the entire length of the tubing 122 may be flexible.

The tubing 122 may have a sufficient length to allow convenient operation remote from the analytical instrument 103. For example, the length of the tubing 122 may be at least 1 m, 2 m, 3 m or 4 m.

In embodiments, the sampling tubing 122 comprises a heated portion, or may be heated. This may facilitate desolvation of the analyte material, and thus increase sample signal.

The tubing 122 may be formed of an inert material, such as a plastic, such as Tygon®. The inventors have found that the use of an inert material can reduce signal losses, which may be caused, for example, by charged droplets and/or ions sticking to the tubing.

The analytical instrument 103 can be any suitable analytical instrument, such as a mass spectrometer and/or ion mobility spectrometer.

The atmospheric interface 131 of the analytical instrument 103 may be heated, e.g. up to a temperature of about 500° C. For example, the atmospheric interface 131 may comprise a heated capillary (not shown) through which droplets can pass. This may facilitate desolvation of the analyte material, and thus increase sample signal.

Analyte ions from the sample may thus be provided within a first vacuum chamber of the analytical instrument 103. The analytical instrument 103 may analyse the analyte ions to determine their mass to charge ratio and/or ion mobility, and/or to determine the mass to charge ratio and/or ion mobility of ions derived from the initial ions (for example by fragmenting the initial ions).

The analytical instrument 103 may include, or be in communication with, a processor configured to use the analysis to classify the sample. The classification may be performed substantially in real time.

Figure 2:
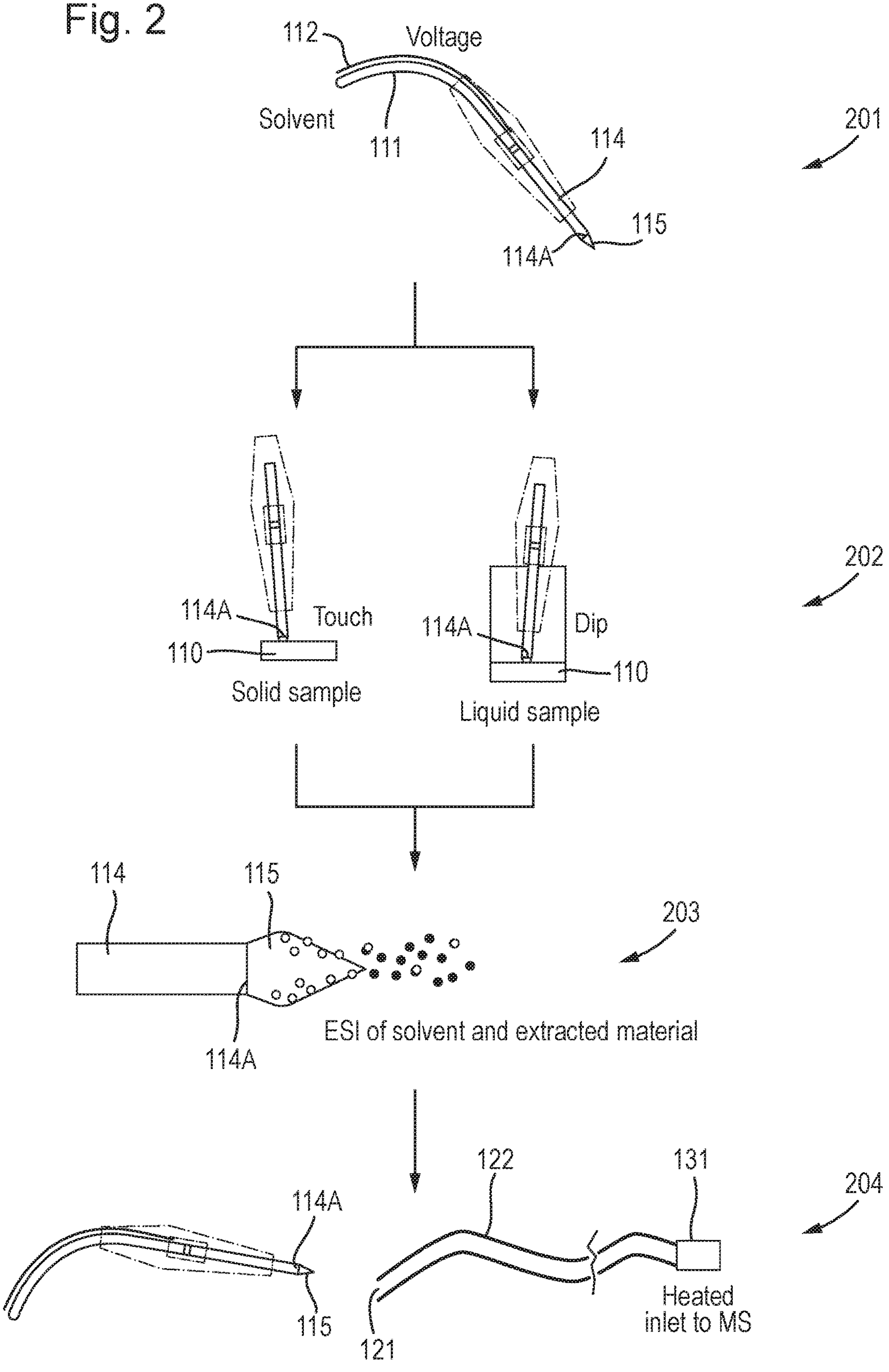
FIG. 2 shows a sample analysis process in accordance with an embodiment.

FIG. 2 shows a method of analysing a sample according to an embodiment of the present invention.

At step 201, a flow of solvent is supplied to the solvent emitting device 101 via solvent supply tubing 111, such that solvent is emitted at the tip 114A of the capillary 114. The flow of solvent may be maintained (e.g. continuously) during at least the subsequent steps 202, 203 and 204 described below. A voltage may also optionally be applied to the solvent emitting device 101 via electrical cable 112 at step 201. In the case of a voltage being applied, the emitted solvent may be in the form of a spray of charged solvent droplets 115. In the case of a voltage not being applied, the emitted solvent may be an uncharged spray.

At step 202, a user brings the tip 114A of the capillary 114 and a sample 110 to be analysed into contact with each other (e.g. while solvent is (still) being emitted at the tip 114A of the capillary 114 due to the flow of solvent). For example, the user may move the handheld device 101 (by holding the handle) such that the tip 114A of the capillary 114 contacts the sample 110.

As shown in FIG. 2, the sample 110 may be a solid sample, in which case the tip 114A of the capillary 114 may touch the surface of the sample, or a liquid sample, in which case the tip 114A of the capillary 114 may dip into the liquid.

Alternatively, the tip 114A of the capillary 114 and the sample 110 may be brought sufficiently close to each other, but without actually physically touching, such that analyte material of the sample 110 collects with, and e.g. is dissolved by, solvent around the tip 114A of the capillary 114.

Where a voltage is applied to the solvent emitting device 101 at step 201, the voltage may continue to be applied during step 202, in which case the spray of charged solvent droplets 115 formed at step 201 may be disrupted by the contact or proximity between tip 114A and sample 110 at step 202. Alternatively, no voltage may be applied during step 202 (and optionally also not applied during step 201).

Not applying a voltage during the sample contact or proximity step (step 202) may be appropriate for analysis of living tissue, for example, e.g. in an intra-operative tissue analysis.

The user then separates the tip 114A of the capillary 114 and the sample 110 (by holding the handle) (e.g. while solvent is (still) being emitted at the tip 114A of the capillary 114 due to the flow of solvent).

As a result of the contact or proximity at step 202, solvent comprising absorbed analyte material of the sample 110 may collect around the tip 114A of the capillary 114, and/or (unabsorbed) analyte material of the sample 110 may collect around the tip 114A of the capillary 114 which is subsequently absorbed by solvent emitted from the tip 114A of the capillary 114. Thus, after the tip 114A and sample are separated, analyte material of the sample 110 may be present around the tip 114A of the capillary 114.

At step 203 (e.g. while solvent is (still) being emitted at the tip 114A of the capillary 114 due to the flow of solvent), a voltage is applied to the device 101 via electrical cable 112 such that a spray of charged solvent droplets 115 forms at the tip 114A of the capillary 114, with droplets of the spray comprising analyte of the sample 110 that collected around the tip 114A of the capillary 114 as a result of the contact or proximity at step 202. The application of the voltage may promote ionisation of analyte molecules.

The voltage may be applied (only) after the tip 114A and sample 110 have been separated. For example, the user may initiate the voltage application after separating the tip 114A and sample 110. Alternatively, where a voltage is applied to the solvent emitting device 101 at step 202 (and optionally also at step 201), the voltage may continue to be applied during step 203. That is, the voltage may be applied continuously.

At step 204, the spray of charged droplets 115 comprising analyte from the sample 110 is sampled by the sampling assembly 102. For example, the user may move the tip 114A of the capillary 114 into the vicinity of the inlet 121 of the tubing 122, and/or move the inlet 121 of the tubing 122 into the vicinity of the tip 114A of the capillary 114, such that at least some charged droplets emitted by the device 101 enter the inlet 121 of the tubing 122. For example, the tip 114A may be directed towards the inlet 121, with the distance between the tip 114A and the inlet 121 being, for example, less than 5 cm, less than 2 cm or less than 1 cm. Emitted charged droplets enter the inlet 121 without impacting the sample 110.

The voltage may be applied (only) after the tip 114A is in the vicinity of the inlet 121, or the voltage may be applied and then the tip 114A and inlet 121 may be brought into the vicinity of each other.

The solvent may evaporate as it travels towards the analytical instrument 103, e.g. in the tubing 122, and/or in the atmospheric interface 131 of the analytical instrument 103, to release analyte ions. The analyte ions may then be analysed by the analytical instrument 103. The analysis may be used to classify the sample.

The classification may be performed substantially in real time.

For example, a multivariate and/or library-based analysis may be used to classify the sample. For example, the analysis may comprise one or more of: (i) univariate analysis; (ii) multivariate analysis; (iii) principal component analysis (PCA); (iv) linear discriminant analysis (LDA); (v) maximum margin criteria (MMC); (vi) library-based analysis; (vii) soft independent modelling of class analogy (SIMCA); (viii) factor analysis (FA); (ix) recursive partitioning (decision trees); (x) random forests; (xi) independent component analysis (ICA); (xii) partial least squares discriminant analysis (PLS-DA); (xiii) orthogonal (partial least squares) projections to latent structures (OPLS); (xiv) OPLS discriminant analysis (OPLS-DA); (xv) support vector machines (SVM); (xvi) (artificial) neural networks; (xvii) multilayer perceptron; (xviii) radial basis function (RBF) networks; (xix) Bayesian analysis; (xx) cluster analysis; (xxi) a kernelized method; (xxii) subspace discriminant analysis; (xxiii) k-nearest neighbours (KNN); (xxiv) quadratic discriminant analysis (QDA); (xxv) probabilistic principal component Analysis (PPCA); (xxvi) non negative matrix factorisation; (xxvii) k-means factorisation; (xxviii) fuzzy c-means factorisation; and (xxix) discriminant analysis (DA).

The method may optionally include interrupting or stopping the supplied flow of solvent and/or applied voltage following the sample analysis, e.g. following step 204.

After a first sample analysis has been performed, a next sample analysis may then be performed. For example, the process may return to step 201 for the next sample (or portion of the same sample) to be analysed, and so on.

The method may optionally include cleaning the tip 114A of the capillary 114 following and/or before a sample analysis. For example, the tip 114A may be wiped, e.g. in between analyses of different samples or portions of the same sample. This may further reduce any signal carry over.

The inventors have found that embodiments of the present invention can provide a method of analysing a sample that is particularly convenient and simple, e.g. as compared to existing ambient ionisation techniques. For example, embodiments can allow direct sampling of both solid surfaces and liquids (or optionally gases) using a single apparatus configured in the same manner.

Furthermore, embodiments can provide a handheld analysis device which can be freely brought into contact with a sample remote from a mass and/or mobility spectrometer, e.g. in order to provide a 'point-and-click' type analysis.

The inventors have found that the combination of direct and remote analysis coupled to real-time results of embodiments of the present invention may be particularly suitable for applications in clinical, pharmaceutical, forensic and airport security settings, amongst others.

Figure 3:
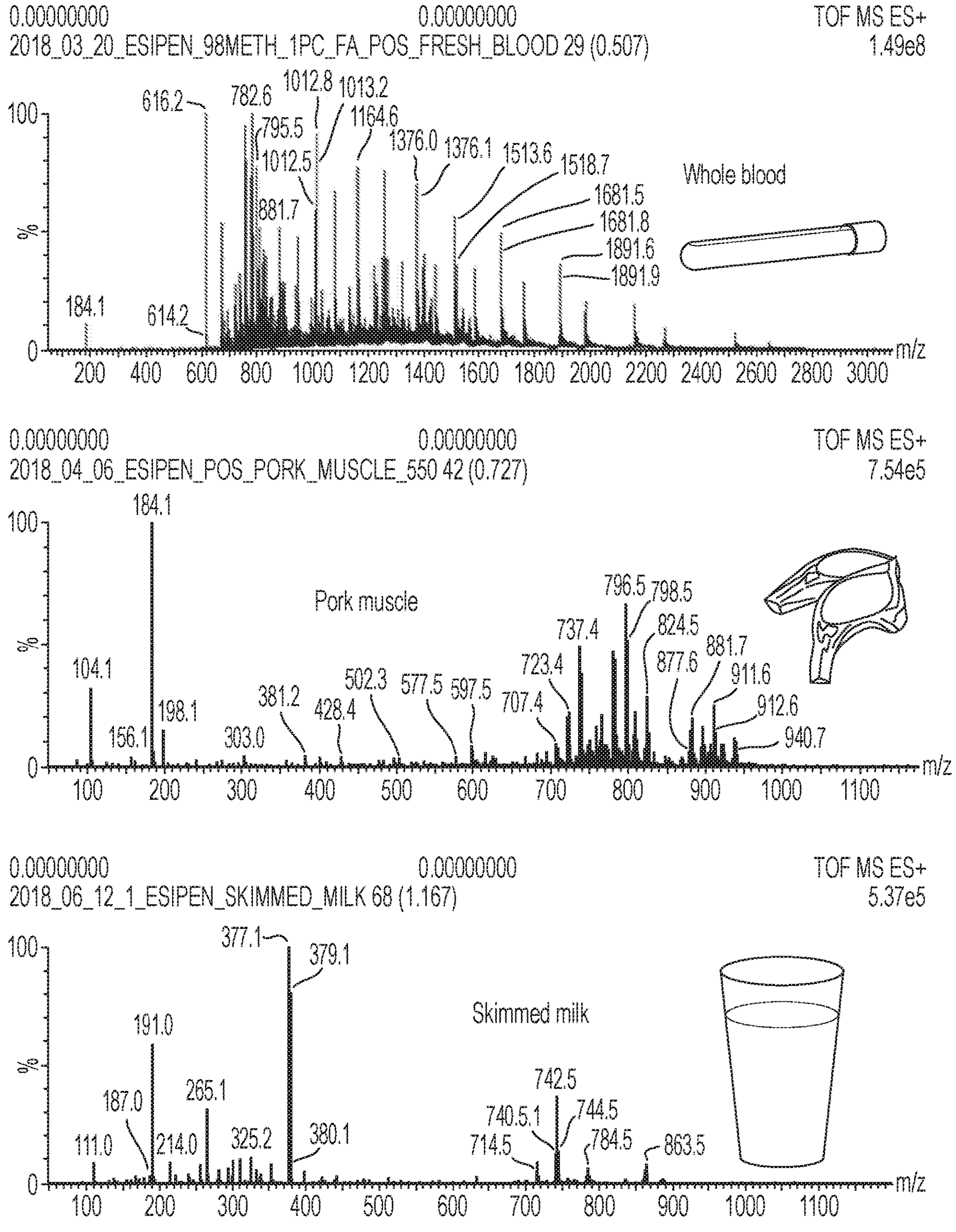
FIG. 3 shows mass spectra obtained in accordance with an embodiment.
Figure 3:
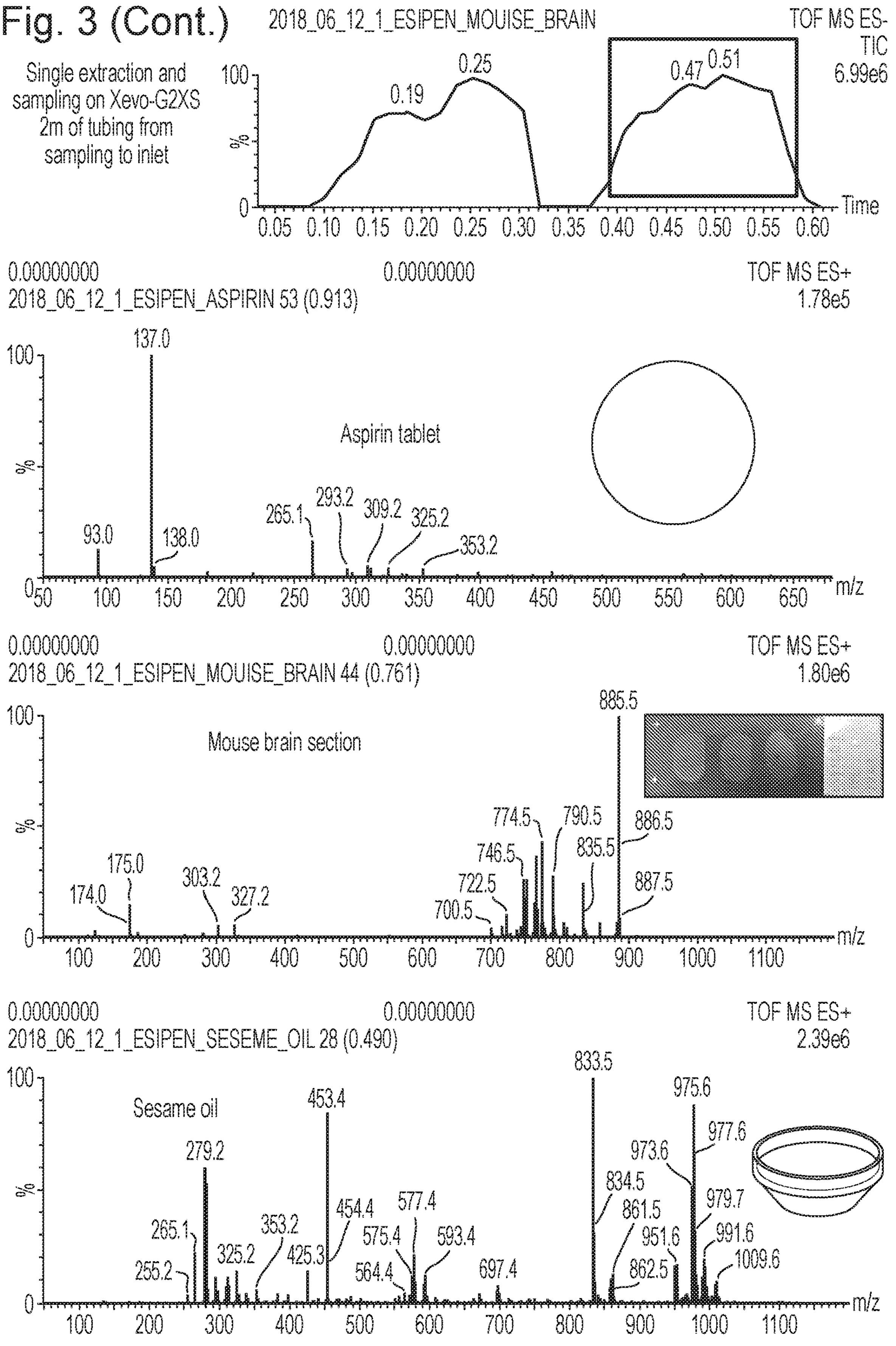

FIG. 3 illustrates various analyses of various liquids and solid surfaces performed according to a method as described above. The mass spectra shown in FIG. 3 were each acquired by using the handheld solvent emitting device 101 to perform a single sample extraction, with a 2 m long flexible Tygon® tube, and a Waters Xevo® G2-XS QTof Quadrupole Time-of-Flight mass spectrometer. A solvent consisting of 98% methanol and 2% water was continuously supplied to the device 101 via solvent supply tubing 111 at a flow rate of 7 μL/min, and a voltage of 5 kV was continuously applied via electrical cable 112.

As shown in FIG. 3, the technique is suitable for analysing both liquids and solid surfaces using the same apparatus configuration. For example, FIG. 3 show mass spectra obtained for liquids, including blood, milk, and sesame oil. The technique has also been used to analyse other liquids, including other oils and analytical standard solutions. FIG. 3 also shows mass spectra for solid surfaces, including pork muscle, aspirin and mouse brain section. The technique has been used to analyse other solid surfaces, including other flesh, biological tissue sections, bacterial colonies, pharmaceutical tablets and plastic objects. The technique has furthermore been found suitable for analysing nose swabs.

Figure 4:
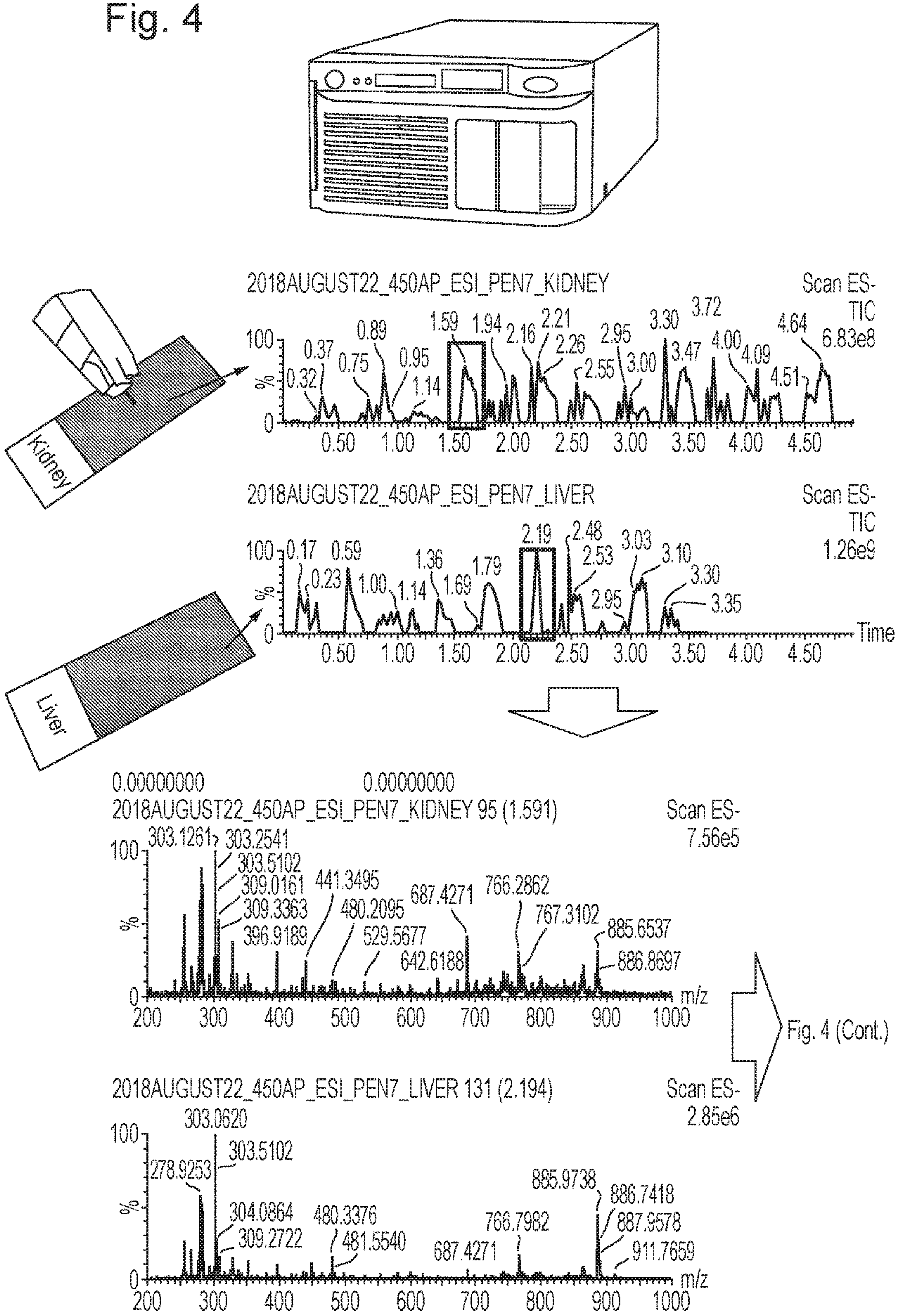
FIG. 4 illustrates real-time sample classification in accordance with an embodiment.
Figure 4:
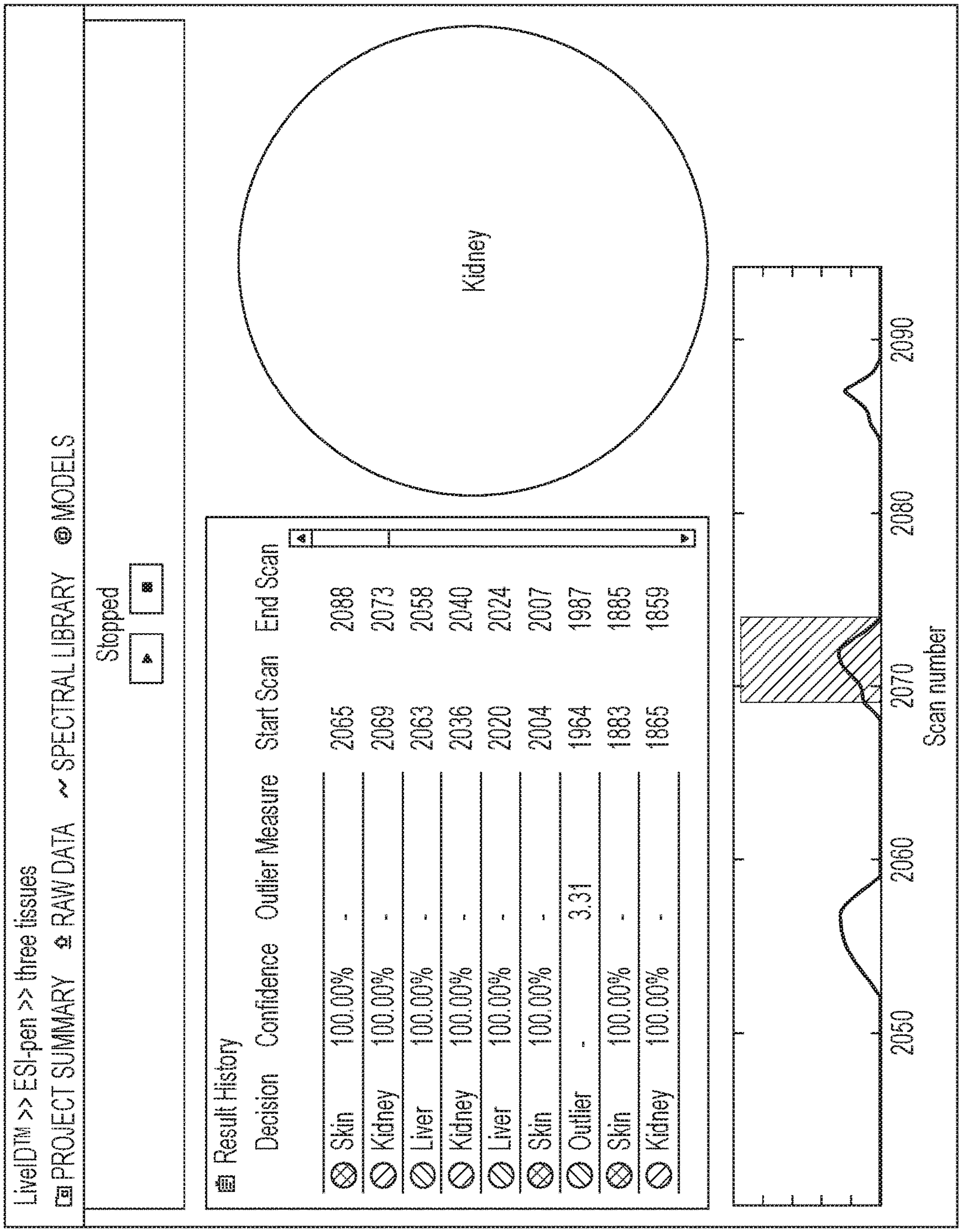

FIG. 4 shows another example analysis. In this example, a portable, single quadrupole mass spectrometer (Waters ACQUITY QDa Mass Detector) was used to obtain mass spectra. The mass spectra obtained were analysed using Principal Component Analysis (PCA) and Linear Discriminant Analysis (LDA) (Waters LiveID software) in order to classify the sample substantially in real time.

Although in the above embodiments, the sampling tubing 122 is provided separate from the solvent emitting device 101, in other embodiments the sampling tubing 122 and solvent emitting device 101 are integrated into the same device. For example, FIG. 5 shows a handheld device 501 which includes both the sampling tubing and solvent supply built into the same device.

As shown in FIG. 5, in this embodiment, the sampling tubing 122 may extend from the housing 113 from substantially the same location as the solvent supply tubing 111. For example, the solvent supply tubing 111 and sampling tubing 122 may extend from an axial (proximal) end of the housing 113 that is opposite to the outlet or solvent-emitting tip 114A (at the distal end of the housing 113). Moreover, the solvent supply tubing 111 and sampling tubing 122 (and electrical cable 112 (not shown)) may be mechanically linked to form a single flexible assembly.

Figure 5A:
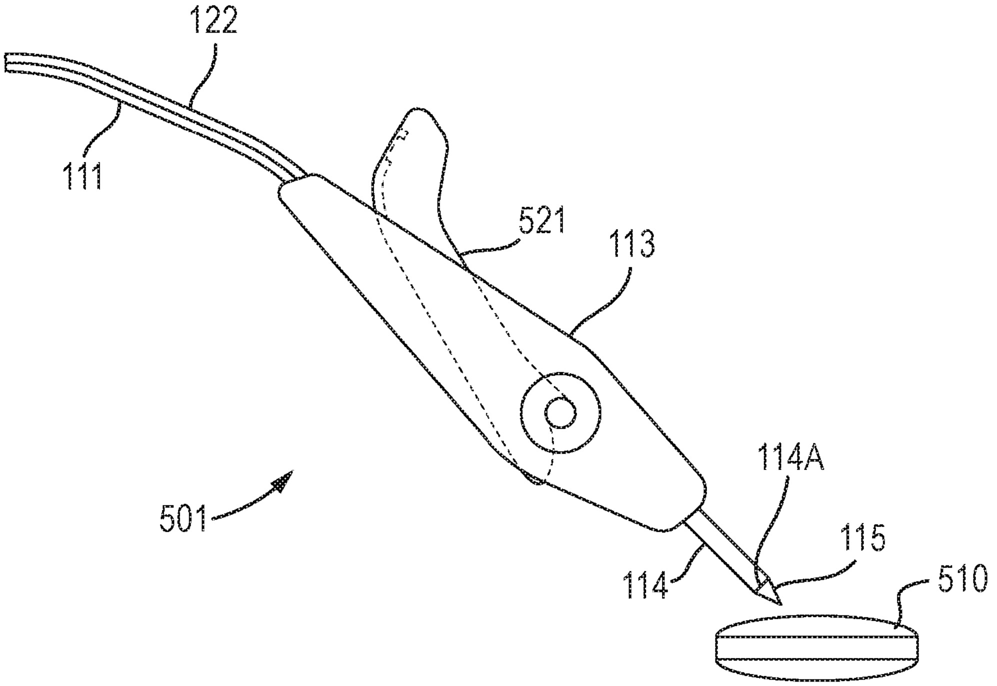
FIGS. 5A and 5B show a sample analysis apparatus in accordance with an embodiment.
Figure 5B:
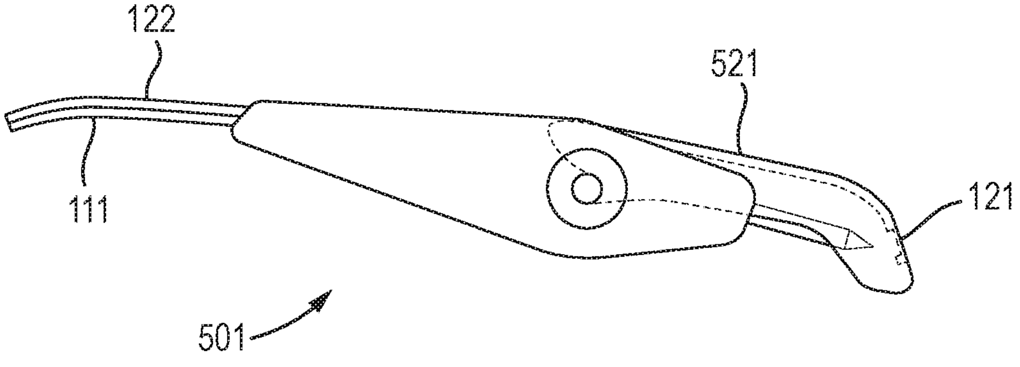

As shown in FIG. 5, the device 501 may be configured such that the inlet 121 to the sampling tubing 122 can move relative to the outlet or solvent-emitting tip 114A of the solvent capillary 114, for example between a first position in which the inlet 121 is remote from the outlet or solvent-emitting tip 114A of the solvent capillary 114 (e.g. as shown in FIG. 5A), and a second position in which the inlet 121 is arranged downstream of the outlet or solvent-emitting tip 114A (e.g. as shown in FIG. 5B). In the second position, the inlet 121 may be able to directly receive droplets emitted at the outlet or solvent-emitting tip 114A (e.g. without the droplets impacting the sample 510), whereas in the first position, the inlet 121 may be positioned to avoid interference with the outlet or solvent-emitting tip 114A being brought into contact with the sample 510.

For example, as shown in FIG. 5, the device 510 may include a rotatable member 521 that is rotatably connected to the housing 113 of the device, with the sampling tubing 122 connected to, and extending through, the rotatable member 521. The rotatable member 521 may be rotatable between a first position, e.g. as shown in FIG. 5A, in which the sampling tubing inlet end 121 and rotatable member 521 are remote from, and so do not interfere with, the outlet or solvent-emitting tip 114A, and a second position, e.g. as shown in FIG. 5B, in which the inlet 121 is arranged downstream of the outlet or solvent-emitting tip 114A so that it can receive droplets emitted at the outlet or solvent-emitting tip 114A.

In use, a user may bring the tip 114A of the capillary 114 and a sample 510 to be analysed into contact with each other (i.e. perform step 202 of the above process) while the inlet 121 (and rotatable member 521) is positioned in the first position. Sampling the spray of charged droplets comprising analyte from the sample 501 (i.e. step 204 of the above process) may then comprise moving the inlet 121 (and rotatable member 521) to the second position.

As can be seen in FIG. 5B, the rotatable member 521 may furthermore act as a cover for protecting the solvent-emitting tip 114A from damage, e.g. when the device 501 is not in use.

Figure 6A:
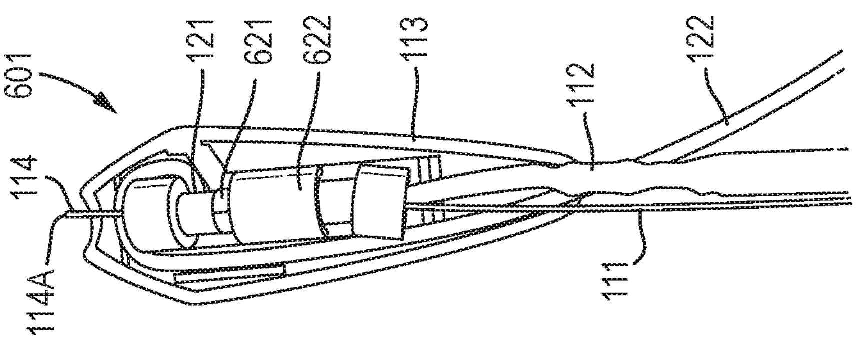
FIGS. 6A, 6B and 6C show a sample analysis apparatus in accordance with an embodiment.

FIG. 6 shows another embodiment of a handheld device 601 in which both the sampling tubing and solvent supply are built into the same device. The embodiment shown in FIG. 6 includes a number of the features already described above, and only main differences with respect to the embodiment of FIG. 5 will now be described. It will be appreciated that FIG. 6A shows the device 601 with a half of the housing 113 removed for illustration purposes.

Figure 6B:
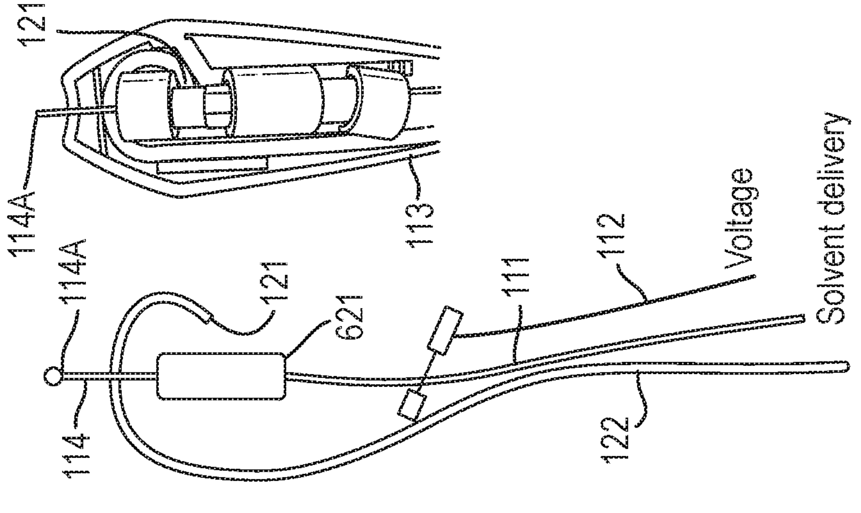
Figure 6C:
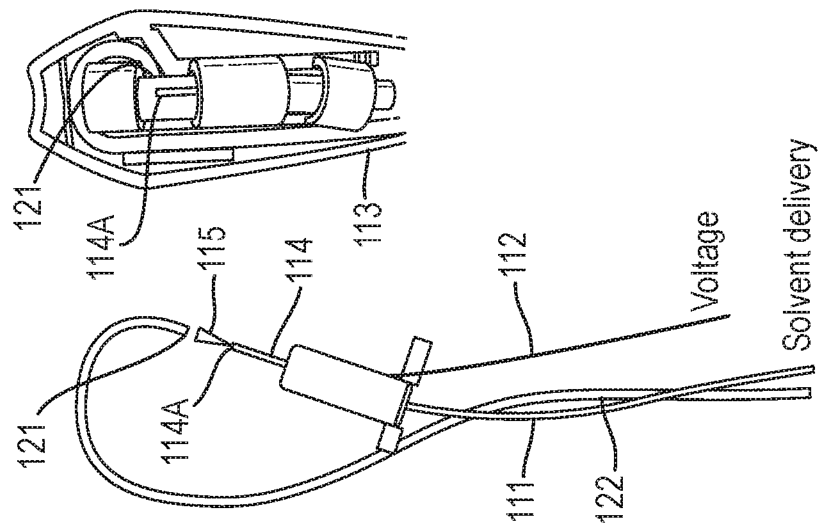

In contrast with the embodiment of FIG. 5 in which the inlet 121 to the sampling tubing 122 is moveable relative to the housing 113 and outlet or solvent-emitting tip 114A of the solvent capillary 114 (with the outlet or solvent-emitting tip 114A of the solvent capillary 114 being fixed in position relative to the housing 113), in the embodiment shown in FIGS. 6A-C the outlet or solvent-emitting tip 114A of the solvent capillary 114 is moveable relative to the housing 113 and inlet 121 to the sampling tubing 122 (with the inlet 121 to the sampling tubing 122 being fixed in position relative to (and within) the housing 113).

In particular, as shown in FIG. 6, the device 601 may be configured such that the solvent-emitting tip 114A of the solvent capillary 114 can move relative to the inlet 121 to the sampling tubing 122, for example between a first position in which the solvent-emitting tip 114A is remote from the inlet 121 (e.g. as shown in FIG. 6B), and a second position in which the solvent-emitting tip 114A is arranged proximate to and upstream of the inlet 121 (e.g. as shown in FIG. 6C). In the second position, the inlet 121 may be able to directly receive droplets 115 emitted at the solvent-emitting tip 114A (e.g. without the droplets 115 impacting the sample), whereas in the first position, the solvent-emitting tip 114A may be positioned such that it can be brought into contact with the sample.

For example, as shown in FIG. 6, the capillary 114 may be connected to a slidable member 621, and the housing 113 may include one or more complimentary features 622 configured to receive the slidable member 621, and through which the slidable member 621 can slide. The arrangement may be such that the solvent capillary 114 can slide axially between a first, extended position, e.g. as shown in FIG. 6B, in which the solvent-emitting tip 114A projects beyond a distal end of the housing 113, and a second, retracted position, e.g. as shown in FIG. 6C, in which the solvent-emitting tip 114A is arranged within the housing 114 and upstream of the inlet 121 so that the inlet 121 can receive droplets 115 emitted at the solvent-emitting tip 114A.

As illustrated in FIG. 6, the device 601 may be configured such that a voltage supplied by electrical cable 112 is applied to solvent to form an electrospray 115 when the capillary 114 is positioned in the second position (e.g. as shown in FIG. 6C), but is not applied to solvent when the capillary 114 is positioned in the first position (e.g. as shown in FIG. 6B).

In use, a user may bring the tip 114A of the capillary 114 and a sample to be analysed into contact with each other (i.e. perform step 202 of the above process) while the solvent capillary 114 is positioned in the first, extended position.

Sampling the spray of charged droplets comprising analyte from the sample (i.e. step 204 of the above process) may then comprise retracting the solvent capillary 114 to the second, retracted position.

As can be seen in FIG. 6C, in this embodiment, the housing 113 may act as a cover for protecting the solvent-emitting tip 114A from damage, e.g. when the device 601 is not in use.

The present invention may have particular application in food and environmental, surgical, at-line testing, transport security, illicit drug testing, and forensics contexts.

In embodiments, the device may be used intra-surgically, e.g. for cancer surgery applications. This may, for example, allow a surgeon to measure any suspicious tissue on the time scale of seconds, e.g. as compared to tens of minutes for other, e.g. frozen tissue section, approaches. Moreover, the present invention can a minimally invasive analysis, e.g. as compared to frozen section approaches where significant amounts of tissue may need to be removed. Accordingly, the present invention may facilitate a 'test everything' approach, e.g. as compared to a 'test only what is practical' approach. In embodiments, the method may be coupled to augmented visualisation, e.g. for providing surgical direction for complex procedures.

In embodiments, the sample is non-living. In embodiments where the sample from a human or animal body, the sample may be first removed from the body before analysis. In embodiments, the method is non-surgical and/or non-therapeutic and/or non-diagnostic.

Although the present invention has been described with reference to preferred embodiments, it will be understood by those skilled in the art that various changes in form and detail may be made without departing from the scope of the invention as set forth in the accompanying claims.

The invention claimed is:

1. A method of analysing a sample, the method comprising:

providing a capillary having an outlet at a first end;

supplying a flow of solvent to the capillary such that solvent is emitted from the outlet of the capillary;

bringing the sample and the first end of the capillary into contact with, or proximate to, each other such that analyte from the sample is absorbed by solvent emitted from the outlet of the capillary;

applying a voltage to the solvent such that charged droplets of the solvent comprising the analyte from the sample are emitted from the first end of the capillary; and causing the charged droplets to be drawn into one or more sampling conduits connected to an atmospheric interface of an analytical instrument;

wherein the capillary is housed by a housing;

wherein the one or more sampling conduits comprise one or more inlets that are connected to a rotatable member that is rotatably connected to the housing such that the one or more inlets can move relative to the first end of the capillary between at least a first position in which the one or more inlets are positioned away from the first end of the capillary, and a second position in which the one or more inlets are positioned downstream of the first end of the capillary by rotating the rotatable member; and wherein causing the charged droplets to be drawn into the one or more sampling conduits comprises rotating the rotatable member.

2. A method of analysing a sample, the method comprising:

providing a capillary having an outlet at a first end;

supplying a flow of solvent to the capillary such that solvent is emitted from the outlet of the capillary;

bringing the sample and the first end of the capillary into contact with, or proximate to, each other such that analyte from the sample collects around the first end of the capillary;

separating the sample and the first end of the capillary, and applying a voltage to the solvent such that charged droplets of the solvent comprising the analyte from the sample are emitted from the first end of the capillary; and causing the charged droplets to be drawn into one or more sampling conduits connected to an atmospheric interface of an analytical instrument;

wherein the capillary is housed by a housing that forms a handle, the first end of the capillary is arranged at a distal end of the housing, and the one or more sampling conduits extend from the housing from a proximal end of the housing;

wherein the one or more sampling conduits comprise one or more inlets, the first end of the capillary and/or the one or more inlets are moveable between at least a first position in which the one or more inlets are positioned away from the first end of the capillary, and a second position in which the one or more inlets are positioned downstream of the first end of the capillary; and wherein causing the charged droplets to be drawn into the one or more sampling conduits comprises moving the first end of the capillary and/or the one or more inlets into the second position such that the charged droplets emitted from the first end of the capillary are drawn into the one or more sampling conduits through the one or more inlets.

3. The method of claim 2, comprising bringing the sample and the first end of the capillary into contact with, or proximate to, each other without applying the voltage, then separating the sample and the first end of the capillary, and then applying the voltage.

4. The method of claim 2, wherein the charged droplets are emitted from the first end of the capillary as a spray, and a nebulising gas is not used to form the spray.

5. The method of claim 2, wherein the charged droplets of the solvent comprising the analyte from the sample do not impact the sample after being emitted from the first end of the capillary.

6. The method of claim 2, wherein the capillary is connected to the housing such that the first end of the capillary can move relative to the one or more inlets between the first and second positions, wherein in the first position the first end of the capillary extends out of the housing, and in the second position the first end of the capillary is arranged within the housing.

7. The method of claim 2, wherein the one or more inlets are connected to a rotatable member that is rotatably connected to the housing such that the one or more inlets can move relative to the first end of the capillary between the first and second positions by rotating the rotatable member; wherein moving the first end of the capillary and/or the one or more inlets into the second position comprises rotating the rotatable member.

8. The method of claim 7, wherein the rotatable member forms a cover for the first end of the capillary when it is in the second position.

9. The method of claim 2, comprising causing evaporation of the charged droplets such that analyte ions are released, and wherein the analytical instrument analyses the analyte ions.

10. The method of claim 9, wherein causing evaporation of the charged droplets comprises heating the charged droplets.

11. The method of claim 9, comprising using the analysis of the analyte ions to classify the sample, optionally substantially in real time.

12. The method of claim 9, wherein the analytical instrument is a mass spectrometer and/or an ion mobility spectrometer.

13. An apparatus for analysing a sample, the apparatus comprising:

a capillary comprising a bore that runs centrally along a longitudinal axis of the capillary and forms an outlet at a first end of the capillary;

a solvent supply line configured to supply a flow of solvent to the capillary such that solvent passes through the bore of the capillary and is emitted from the outlet of the capillary;

a conductor configured to apply a voltage to solvent supplied to the capillary by the solvent supply line such that charged droplets of the solvent are emitted from the first end of the capillary;

one or more sampling conduits connectable to an atmospheric interface of an analytical instrument, wherein the one or more sampling conduits comprise one or more inlets, wherein the one or more inlets are moveable relative to the first end of the capillary and/or the first end of the capillary is moveable relative to the one or more inlets, and wherein the one or more inlets are configured to receive charged droplets emitted from the first end of the capillary when positioned downstream of the first end of the capillary;

a housing for the capillary; and a moveable member moveably connected to the housing, wherein the capillary and/or the one or more sampling conduits are connected to the moveable member such that the first end of the capillary and/or the one or more inlets can move between a first position in which the one or more inlets are positioned away from the first end of the capillary, and a second position in which the one or more inlets are positioned downstream of the first end of the capillary;

wherein the housing forms a handle, wherein the first end of the capillary is arranged at a distal end of the housing, and the solvent supply line and the one or more sampling conduits extend from the housing from a proximal end of the housing.

14. The apparatus of claim 13, configured such that the charged droplets are emitted from the first end of the capillary as a spray by providing the solvent to the capillary and without the use of a nebulising gas.

15. The apparatus of claim 13, wherein the apparatus is configured such that charged droplets received by the one or more inlets evaporate such that analyte ions are released, and wherein the analytical instrument is configured to analyse the released analyte ions, optionally wherein the analytical instrument is a mass spectrometer and/or ion mobility spectrometer.

* * * * *